United States Patent
Wang et al.

(10) Patent No.: US 11,758,477 B2
(45) Date of Patent: Sep. 12, 2023

(54) UE POWER SAVING FOR PAGING

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/330,277

(22) Filed: May 25, 2021

(65) Prior Publication Data

US 2021/0400578 A1    Dec. 23, 2021

Related U.S. Application Data

(60) Provisional application No. 63/040,127, filed on Jun. 17, 2020.

(51) Int. Cl.
*H04W 52/02* (2009.01)
*H04W 68/02* (2009.01)

(52) U.S. Cl.
CPC ....... *H04W 52/0212* (2013.01); *H04W 68/02* (2013.01); *H04W 52/0229* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 2007/0171850 A1* | 7/2007 | Feder | H04W 68/005 370/335 |
| 2012/0083293 A1* | 4/2012 | Bejerano | H04W 68/02 455/458 |
| 2013/0015953 A1* | 1/2013 | Hsu | H04W 4/08 340/7.46 |
| 2013/0339438 A1* | 12/2013 | Cherian | H04W 4/08 709/204 |
| 2014/0221023 A1* | 8/2014 | Maggenti | H04W 68/02 455/458 |
| 2016/0007316 A1* | 1/2016 | Vaidya | H04W 64/003 370/312 |

(Continued)

FOREIGN PATENT DOCUMENTS

| | | | |
|---|---|---|---|
| KR | 20040019379 A | * | 3/2004 |
| KR | 20130073551 A | * | 7/2013 |
| WO | WO-2019063867 A1 | * | 4/2019 |

*Primary Examiner* — Jay L Vogel
(74) *Attorney, Agent, or Firm* — Patterson & Sheridan, L.L.P.

(57) ABSTRACT

Certain aspects of the present disclosure provide techniques for paging in a wireless communication system. A method that may be performed by a base station (BS) generally includes determining one or more groups of UEs, each group of UEs comprising UEs configured to monitor a same paging occasion (PO) for a same paging radio network temporary identifier (PRNTI). The BS determines whether to postpone paging for a group of UEs based, at least in part, on an indication from a network entity of priorities associated with the UEs in the group. The method generally includes paging or postponing paging for at least one of the UEs in the group based on the determination.

19 Claims, 13 Drawing Sheets

(56) References Cited

U.S. PATENT DOCUMENTS

| | | | |
|---|---|---|---|
| 2017/0273056 A1* | 9/2017 | Papasakellariou .. | H04W 52/325 |
| 2020/0322918 A1* | 10/2020 | Shih .................... | H04W 56/001 |
| 2020/0329455 A1* | 10/2020 | Ryu .................... | H04W 68/005 |
| 2021/0136725 A1* | 5/2021 | Wu ..................... | H04W 72/042 |

* cited by examiner

1000

| PO | K | V_0 | V_1 | V_2 | V_3 | V | Action |
|---|---|---|---|---|---|---|---|
| 0 | 3 | 5 | 5 | 5 | NA | 1.67 | Postpone |
| 1 | 3 | 5 | 5 | 1 | NA | 1.22 | Not postpone |
| 2 | 4 | 5 | 5 | 5 | 5 | 1.25 | Not postpone |

| UE $i$ | UE $j$ | False Paging Reception |
|---|---|---|
| Not paged | Not paged | None |
| Paged | Not paged | UE $j$ |
| Not paged | Paged | UE $i$ |
| Paged | Paged | None |

FIG. 12

UE POWER SAVING FOR PAGING

CROSS-REFERENCE TO RELATED APPLICATION(S)

This application claims benefit of and priority to U.S. Provisional Application No. 63/040,127, filed Jun. 17, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for paging one or more user equipments (UEs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Features of this disclosure provide advantages that include improved power saving for paging one or more user equipments (UEs).

Certain aspects of the subject matter described in this disclosure can be implemented in a method for wireless communication by a base station (BS). The method generally includes determining a paging behavior for transmitting a paging message to one or more UEs based on an indication from a network entity of one or more priorities associated with the one or more UEs, of one or more paging occasion (PO) groups of the one or more UEs, or both. The method generally includes paging at least one of the one or more UEs in accordance with the paging behavior.

Certain aspects of the subject matter described in this disclosure can be implemented in another method for wireless communication by a BS. The method generally includes determining one or more groups of UEs. Each group of UEs includes UEs configured to monitor a same paging occasion (PO) for a same paging radio network temporary identifier (PRNTI). The method generally includes determining whether to postpone paging for a group of the one or more groups of UEs based, at least in part, on an indication from a network entity of priorities associated with the UEs in the group. The method generally includes paging or postponing paging for at least one of the UEs in the group based on the determination.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, the description may admit to other equally effective aspects.

FIG. 10 is a table showing example priority values associated with UE paging, in accordance with aspects of the present disclosure.

FIG. 12 is a table with paging information of two UEs to determine a false paging reception, in accordance with aspects of the present disclosure.

To facilitate understanding, identical reference numerals have been used, where possible, to designate identical elements that are common to the figures. Elements disclosed in one aspect may be beneficially utilized on other aspects without specific recitation.

DETAILED DESCRIPTION

Figure 1:
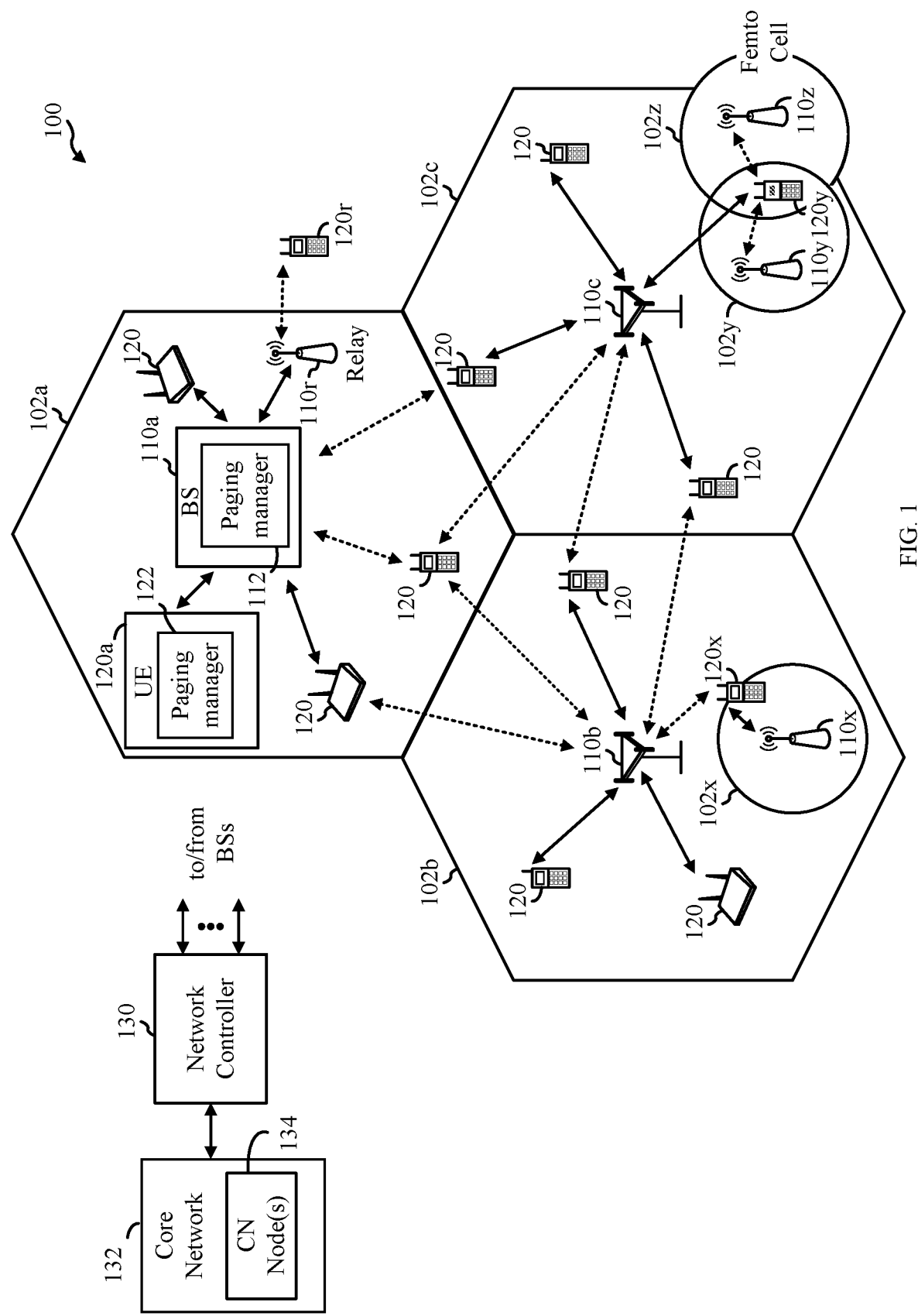
FIG. 1 is a block diagram conceptually illustrating an example telecommunications system, in accordance with certain aspects of the present disclosure.

Aspects of the present disclosure provide apparatus, methods, processing systems, and computer readable mediums for power saving for paging one or more user equipments (UEs).

A paging occasion (PO) group may be a group of UEs that monitors paging in a same paging occasion (PO). Paging may include a paging downlink control information (DCI) and a paging message. The paging message may be sent on a physical downlink control channel (PDSCH). If a base station (BS) has paging for a UE in the group, the BS sends a paging DCI and paging message in the first available PO. The paging DCI does not identify which UE of the group of the UEs is paged. Thus, when the paging DCI is received, all of the UEs in the group monitor for the paging message in the PO. Thus, false paging may occur when there is not a paging message for some of the UEs in the group.

According to certain aspects, a BS may determine a paging behavior for transmitting a paging message to one or more UEs. In some example, the BS can determine to postpone paging. For example, the BS can determine whether to postpone paging for a group of UEs based, at least in part, on an indication of priorities associated with the one or more UEs. In some examples, the BS can further take into account a number of UEs in the group of UEs for which the BS has paging. In some examples, the BS can further take into account a time duration since the BS has paging for the UEs. In some examples, the BS may use a priority threshold, a threshold number of UEs for which the BS has paging, and/or a time duration threshold to determine whether to postpone paging to the group of UEs. In some examples, the BS may group the one or more UEs together based on similar paging traffic patterns. Thus, false paging may be avoided, even when all UEs in a paging group monitor for paging message in a PO when paging DCI is received.

The following description provides examples of power saving for paging one or more UEs in communication systems. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, wireless communication network 100 may be an NR system (e.g., a 5G NR network). As shown in FIG. 1, wireless communication network 100 may be in communication with a core network 132. Core network 132 may in communication with one or more BSs 110 and/or UE 120 in the wireless communication network 100 via one or more interfaces.

As illustrated in FIG. 1, wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for macro cells 102a, 102b and 102c, respectively. BS 110x may be a pico BS for a pico cell 102x. BSs 110y and 110z may be femto BSs for femto cells 102y and 102z, respectively. A BS may support one or multiple cells. A network controller 130 may couple to a set of BSs 110 and provide coordination and control for these BSs 110 (e.g., via a backhaul).

BSs 110 communicate with UEs 120a-y (each also individually referred to herein as UE 120 or collectively as UEs 120) in wireless communication network 100. UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, BSs 110 and/or UEs 120 may be configured for power saving for paging one or more user UEs. As shown in FIG. 1, BS 110a includes a paging manager 112. Paging manager 112 may be configured to determine a paging behavior for transmitting a paging message to one or more UEs based on an indication from a network entity of one or more priorities associated with the one or more UEs, of one or more PO groups of the one or more UEs, or both, and page at least one of the one or more UEs in accordance with the paging behavior, in accordance with aspects of the present disclosure. UE 120a includes a paging manager 122 that may be configured to receive paging from the BS 110a, in accordance with aspects of the present disclosure.

Figure 2:
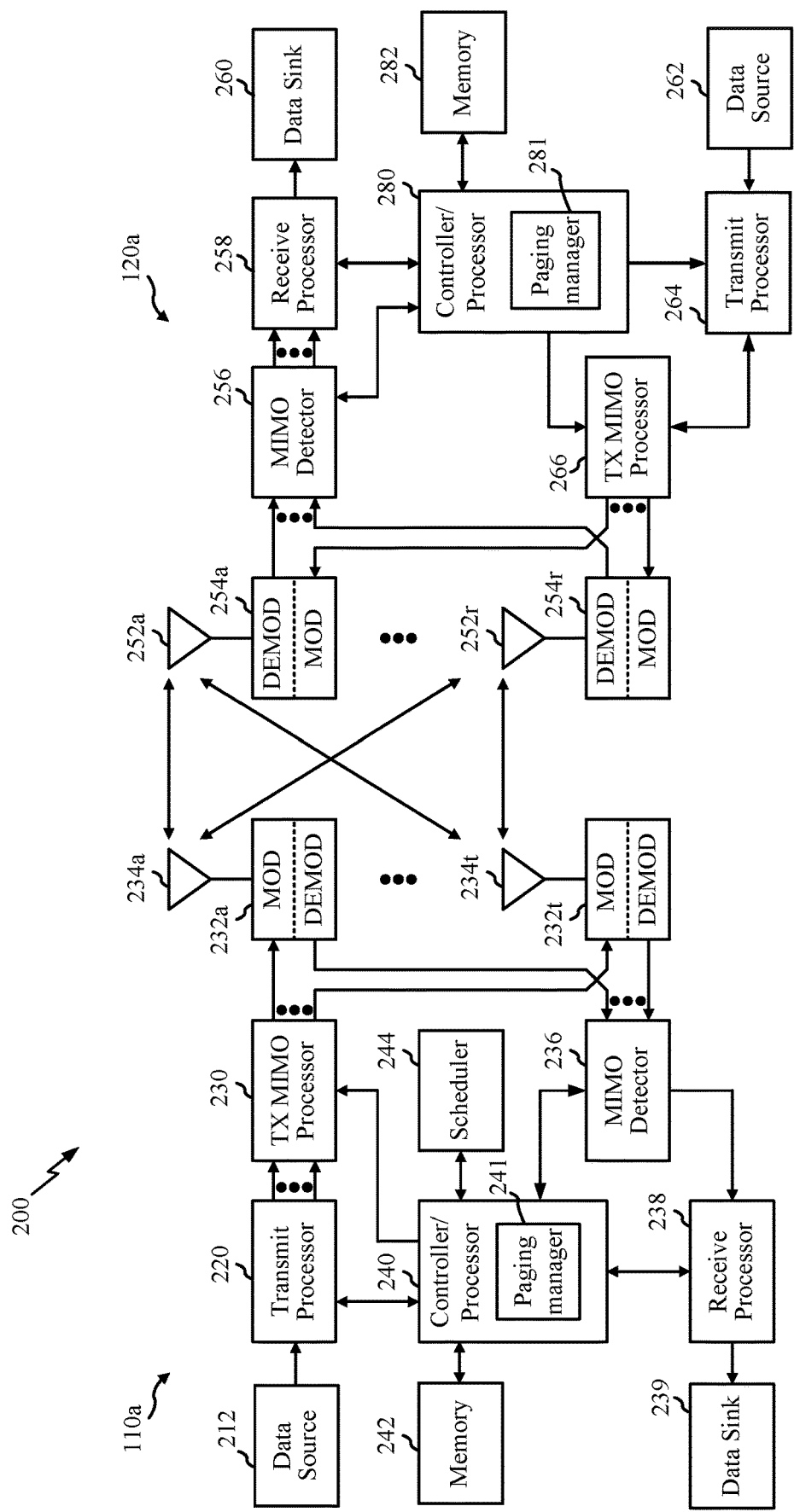
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceiver(s) 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceiver(s) 232a-232t may be transmitted via antennas 234a-234t, respectively.

At UE 120a, antennas 252a-252r may receive the downlink signals from BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all demodulators in transceiver(s) 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from controller/processor 280. Transmit processor 264 may also generate reference symbols for a reference signal (e.g., for the sounding reference signal (SRS)). The symbols from transmit processor 264 may be precoded by a TX MIMO processor 266 if applicable, further processed by the modulators in transceivers 254a-254r (e.g., for SC-FDM, etc.), and transmitted to BS 110a. At BS 110a, the uplink signals from UE 120a may be received by antennas 234, processed by modulators in transceiver(s) 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of the BS 110a has a paging manager 241 that may be configured for determining paging behavior for transmitting a paging message to one or more UEs based on an indication from a network entity of one or more priorities associated with the one or more UEs, of one or more PO groups of the one or more UEs, or both, and paging at least one of the one or more UEs in accordance with the paging behavior, according to aspects described herein. Controller/processor 280 of UE 120a has a paging manager 281 that may be configured to receive the paging from the BS 110a. Although shown at the controller/processor, other components of UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
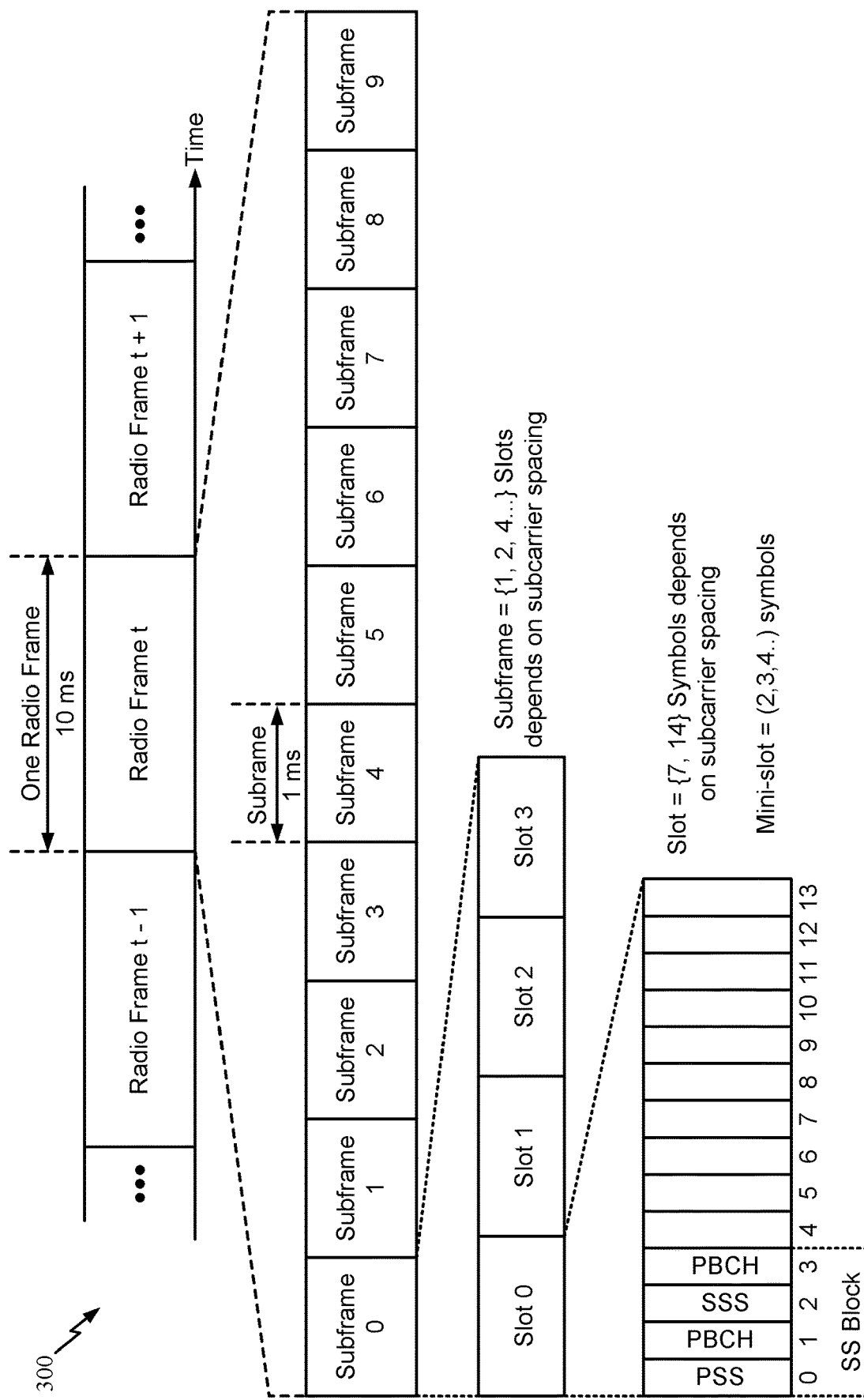
FIG. 3 is an example frame format wireless telecommunications, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 4:
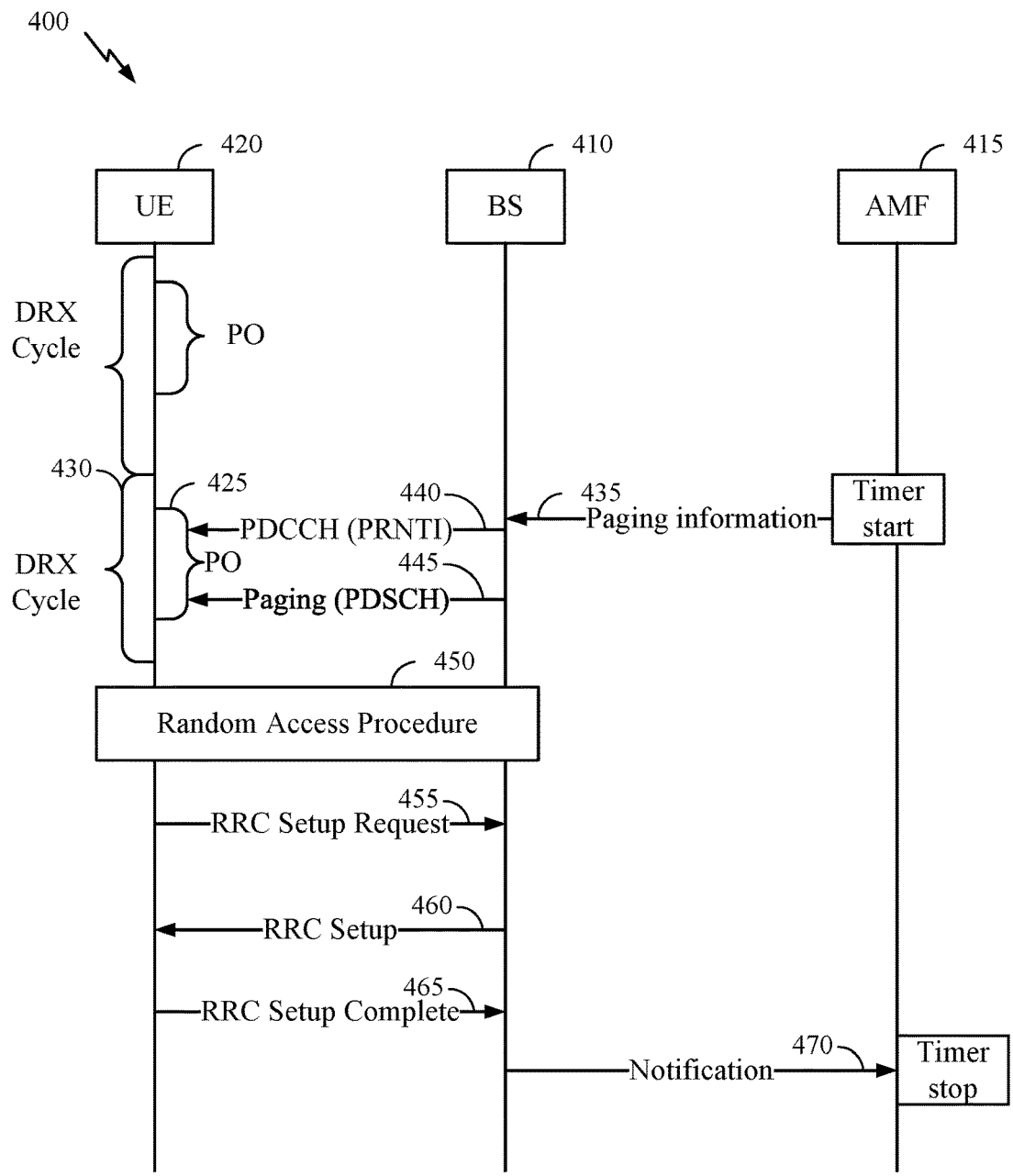
FIG. 4 is a call flow diagram of an example paging procedure between a UE, BS, and access and an access and mobility management function (AMF)

As discussed above, aspects of the disclosure relate to paging. FIG. 4 is a call flow diagram of an example paging procedure 400 between a UE 420, a BS 410, and an access and an access and mobility management function (AMF) 415.

UE 420 may be in a radio resource control (RRC) idle (or RRC inactive) state. UE 420 may monitor in a paging occasion (PO) 425 of a discontinuous reception (DRX) cycle 430. BS 410 receive paging information 435 from AMF 415 to page the UE. The paging information 435 may be next generation application protocol (NGAP) paging information. In some cases, upon sending the paging information 435, AMF 415 start timer. For example, AMF 415 may start T3513 timer initiated at the start of a paging procedure.

Based on paging information 435, BS 410 may page UE 420. Each paging may include a paging downlink control information (DCI) and a paging message. As shown in FIG. 4, BS 410 sends paging DCI over PDCCH 440 to UE 420 in PO 425. In some examples, the paging DCI is a DCI format 1_0, with cyclic redundancy (CRC) bits scrambled by the paging radio network temporary identifier (P-RNTI). The paging DCI may also indicate the resource location of the paging message.

In some examples (e.g., in 3GPP TS 38.212 V16.1.0 (2020-03), Section 7.3.1.2.1), the following information may be transmitted via the DCI format 1_0 with CRC scrambled by P-RNTI: a short messages indicator bit field (e.g., 2 bits according to Table 7.3.1.2.1-1), a short messages bit field (e.g., 8 bits, according to Clause 6.5 of TS 38.331), a frequency domain resource assignment bit field, a time domain resource assignment bit field (e.g., 4 bits as defined in Clause 5.1.2.1 of TS 38.214), a virtual resource block (VRB) to physical resource block (PRB) mapping bit field (e.g., 1 bit according to Table 7.3.1.2.2-5), a modulation and coding scheme bit field (MCS) (e.g., 5 bits as defined in Clause 5.1.3 of TS 38.214, using Table 5.1.3.1-1), a transport block (TB) scaling bit field (e.g., 2 bits as defined in Clause 5.1.3.2 of TS 38.214), and a reserved bits bit field (e.g., 8 bits for operation in a cell with shared spectrum channel access, otherwise 6 bits). In some cases, the bit fields of the DCI format 1_0 may also be reserved bit fields (e.g., when only the short message is carried). However, no UE ID is contained in the paging DCI.

As shown in FIG. 4, the paging message, scheduled the paging DCI, may be sent over PDSCH 445 to UE 420 in PO 425. The paging message may include a list of paging records and address up to 32 different UEs. A UE is paged if its UE Identity (ID) is included in the paging records.

As shown in FIG. 4, after UE 420 receives the paging message, UE 420 may then perform a random access procedure 450 with BS 410. UE 420 may send an RRC setup request message 455 to BS 410. UE 420 may receive an RRC setup message 460 from BS 410 and send RRC setup complete message 465 to BS 410.

As shown in FIG. 4, after the RRC connection is established, BS 410 sends a notification message 470 to AMF 415. Notification message 470 may be an NGAP notification message, such as a service request. Upon reception of notification message 470, AMF 415 stop the timer.

Figure 5:
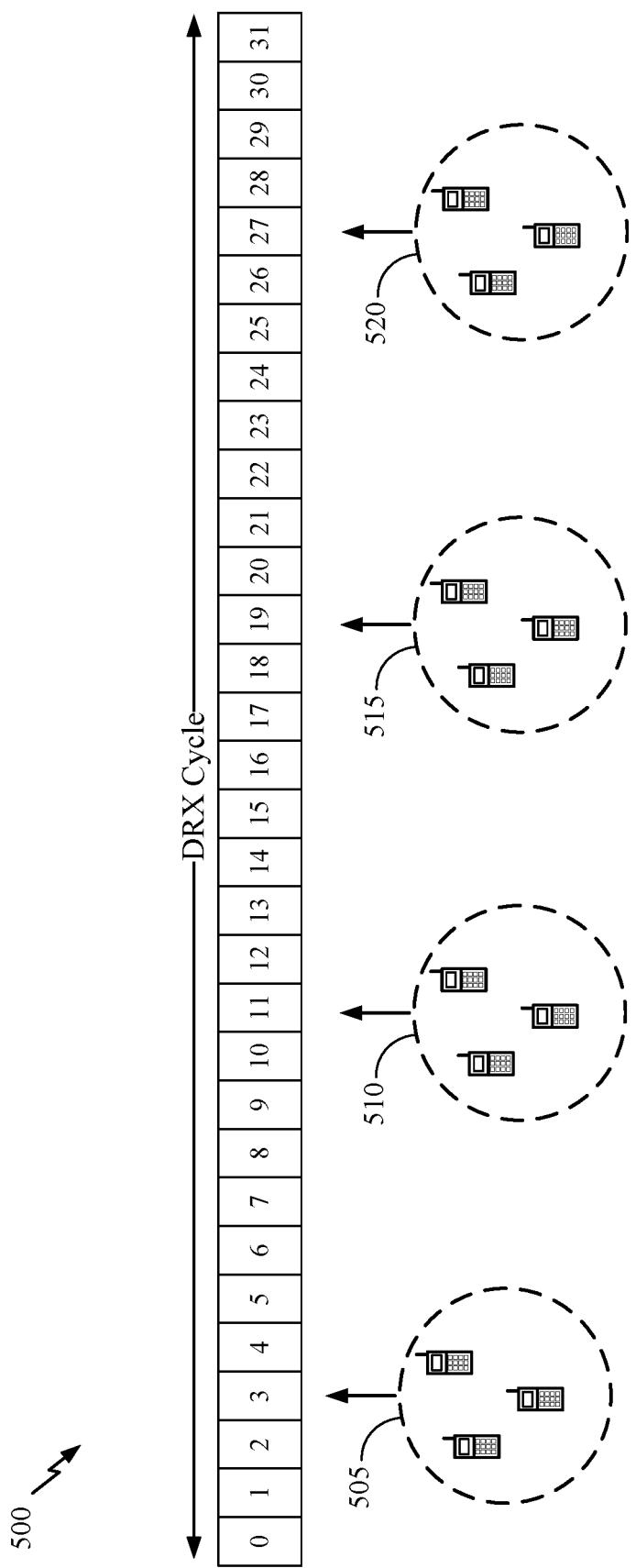
FIG. 5 is a timing diagram of example discontinuous reception (DRX) and paging occasions (POs) for multiple groups of UEs.

FIG. 5 is an example timing diagram of a discontinuous reception (DRX) 500 with paging occasions (POs) for multiple groups of UEs, 505, 510, 515, and 520. As shown, UEs may be divided into groups 505, 510, 515, and 520 to monitor different POs on a per-group basis. For example, UE group 505 may monitor the PO at frame 3, the UE group 510 may monitor the PO at frame 11, the UE group 515 may monitor the PO at frame 19, and the UE group 520 may monitor the PO at frame 27.

A P-RNTI may be a fixed value shared by all UEs in the network. A paging DCI addressed to a P-RNTI has no information of UE ID. Thus a UE does have information to determine if it is meant to be paged after reading the paging DCI. Even if the BS indicates the UE to be paged in the paging message, each UE in the same PO (e.g., each UE in the UE group 1 of FIG. 5) still has to decode the paging message to know if it is paged. Thus, the paging DCI can trigger a false paging reception and wastes power for a UE if that UE was not meant to be paged.

Power consumption in radio resource control (RRC) idle or inactive states may be a considerable factor in battery life. Repetition in paging results in further power consumed by physical downlink shared channel (PDSCH) decoding.

Accordingly, what is needed are techniques and apparatus for power savings in paging for UEs by decreasing false paging receptions.

Example UE Power Saving for Paging

Aspects of the present disclosure provide power saving in paging for user equipments (UEs). According to certain aspects, paging downlink control information (DCI) and paging messages to UEs may be reduced to save power in groups of UEs that monitor a particular paging occasion (PO). For example, a base station (BS) may determine to postpone low-priority paging messages. In some examples, the BS may group UEs based on similar traffic requirements of the UEs. Certain aspects provide for improved power saving even if UEs decode all paging messages received from the BS, as the BS may coordinate paging on a priority and/or traffic requirement basis. Aspects of the present disclosure may be used in combination with each other. Further aspects of the present disclosure may be used in combination with the other techniques described above for reducing false paging and/or other techniques.

Figure 6:
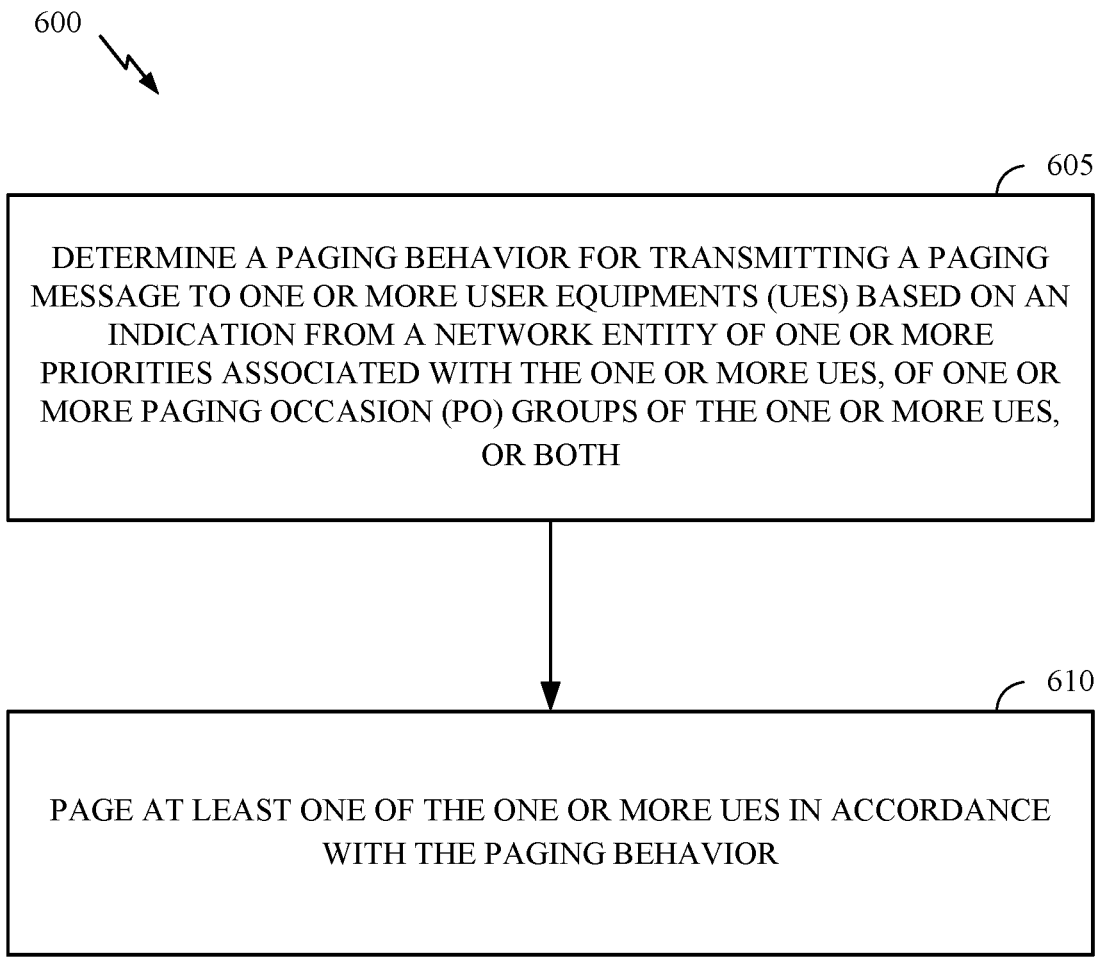
FIG. 6 is a flow diagram illustrating example operations for wireless communication by a BS, in accordance with certain aspects of the present disclosure.

FIG. 6 is a flow diagram illustrating example operations 600 for wireless communication by a BS, in accordance with certain aspects of the present disclosure. The operations 600 may be performed, for example, by a BS (e.g., such as the BS 110a in the wireless communication network 100). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 605, with determining a paging behavior for transmitting a paging message to one or more UEs based on an indication from a network entity of one or more priorities associated with the one or more UEs, of one or more PO groups of the one or more UEs, or both.

At 610, the BS pages at least one of the one or more UEs in accordance with the paging behavior. In certain aspects, the BS may page at least one of the one or more UEs by transmitting a paging downlink control information (DCI) and a paging message.

In certain aspects, the BS may determine the paging behavior by receiving the indication of the one or more priorities associated with the one or more UEs, and determining, based at least in part on the indication of the one or more priorities associated with the one or more UEs, a PO to page the one or more UEs. In this case, based on the indication of the one or more priorities associated with the one or more UEs, the BS may determine a PO to page the one or more UEs by for a group of UEs configured to monitor paging in a same PO, determining whether to page the group of UEs based on the priorities associated with the group of UEs and a number of UEs of the group of UEs that the BS has paging for. In some cases, the BS may determine a PO to page the one or more UEs by determining to page the group of UEs when at least one of the UEs of the group of UEs has a priority above a first threshold, determining to page the group of UEs when the number of UEs of the group of UEs that the BS has paging for is at or above a second threshold, and determining to postpone the paging to a later PO when none of the UEs of the group of UEs has a priority at or above the first threshold and the number of UEs of the group of UEs that the BS has paging for is below the second threshold.

In some cases the BS may determine the paging behavior by determining a priority level of a group of UEs configured to monitor paging in a same PO as a quotient of the sum of the priorities associated with each of the UEs of the group of UEs and a square of the number of the UEs of the group of UEs that the BS has paging for, paging the group of UEs in the PO when the priority level of the group of UEs is at or above a priority level threshold, and postponing paging the group of UEs to a later PO when the priority level of the group is below the priority level threshold.

In certain aspects, the BS may determine the paging behavior by determining the paging behavior based on a time duration since a paging message was received at the BS. In this case, determining the paging behavior may further include receiving one or more paging message for one or more UE in a group of UEs, starting a timer when each of the one or more paging message is received, sending all paging messages for the group of UEs in a PO if a value of the timer of any of the one or more paging messages is at or above a threshold value or a priority level associated with at least one UE in the group of UEs is at or above a priority level threshold, and postponing all paging messages for the groups of UEs in the PO if the value of none of the timers for the one or more paging messages are below the threshold value and each priority level associated with the UEs in the group of UEs is below the priority level threshold.

In certain aspects, the BS may determine the paging behavior by receiving the indication of one or more PO groups of the one or more UEs, and determining, based at least in part on the indication of the one or more PO groups of the one or more UEs, a PO to page the one or more UEs. In this case, the one or more PO groups are based on paging patterns of the one or more UEs, and UEs having similar paging patterns are grouped together. Furthermore, in some examples, the paging pattern includes a history of the paging messages for the one or more UEs. In certain aspects, the paging pattern is represented by a sequence of bits indicating binary numbers, and each binary number of the sequence indicates whether the UE was paged in a PO associated with a bit location within the sequence. Furthermore, in some examples, the paging patterns are tracked by an authentication and management function (AMF).

According to certain aspects, the BS determines whether to send a paging message in a PO, or to postpone the paging, based on a priority associated with UEs and/or the paging. For example, the priority may be based on the type of traffic associated with the UE/paging.

Figure 7:
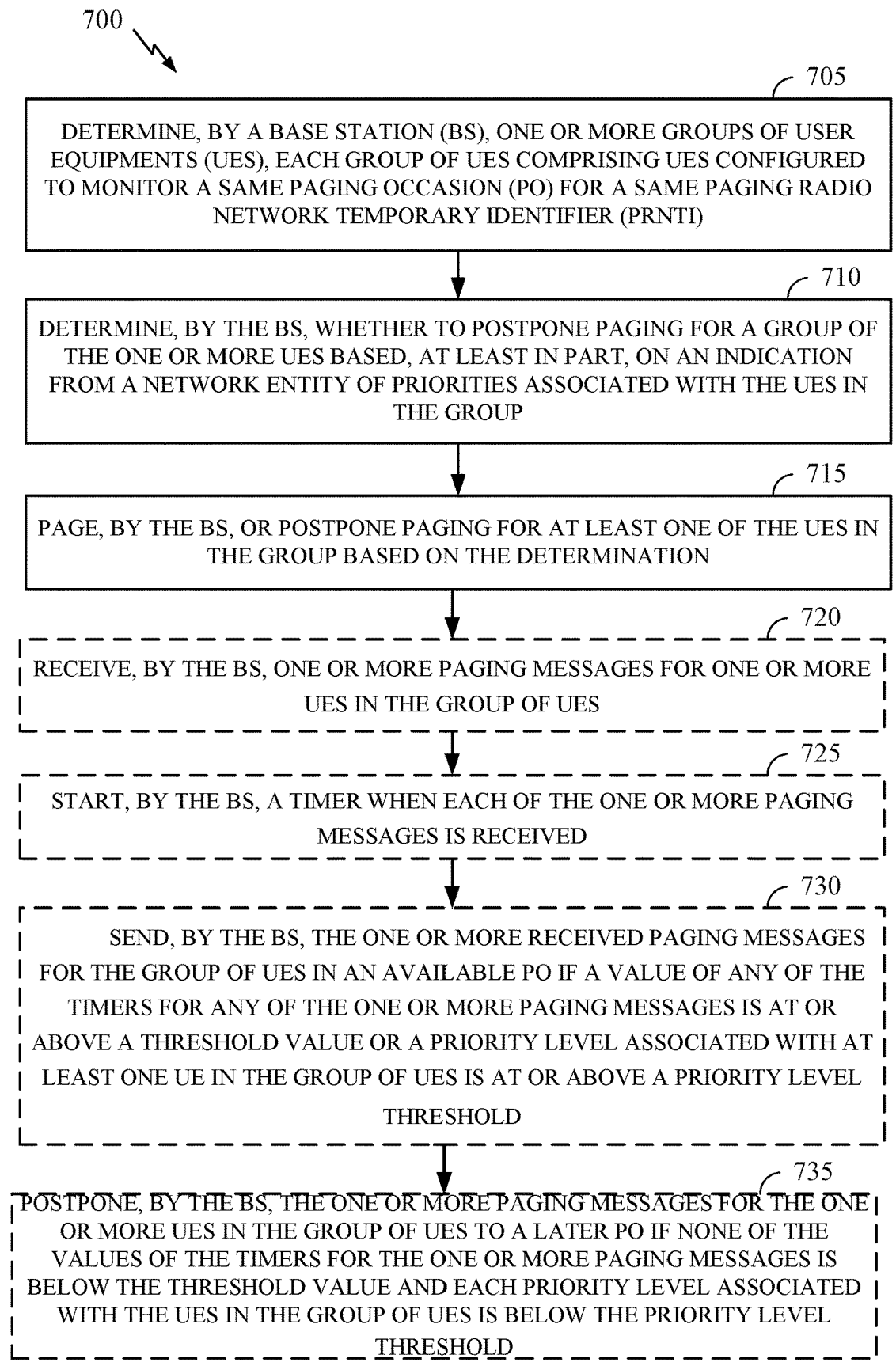
FIG. 7 is another flow diagram illustrating example operations for wireless communication by a BS, in accordance with certain aspects of the present disclosure.

FIG. 7 is another flow diagram illustrating example operations 700 for wireless communication by a BS, in accordance with certain aspects of the present disclosure. The operations 700 may be performed, for example, by a BS (e.g., such as the BS 110a in the wireless communication network 100). Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at 705, by determining one or more groups of UEs. Each group of UEs comprises UEs configured to monitor a same PO for a same paging radio network temporary identifier (PRNTI).

At 710, the BS determines whether to postpone paging for a group of the one or more groups of UEs based, at least in part, on an indication from a network entity of priorities associated with the UEs in the group.

At 715, the BS pages or postpones paging for at least one of the UEs in the group based on the determination.

At 720, the BS may determine receive one or more paging messages for one or more UEs in the group of UEs. At 725, the BS may start a timer when of the one or more paging message is received. At 730, the BS may send the one or more received paging message for the group of UEs in an available PO if a value of any of the timers for any of the one or more paging message is at or above a threshold value or when a priority with at least one UE in the group of UEs is at or above a priority level threshold. Otherwise, at 735, the BS may postpone the one or more received paging message for the group of UEs until a later PO.

Figure 8:
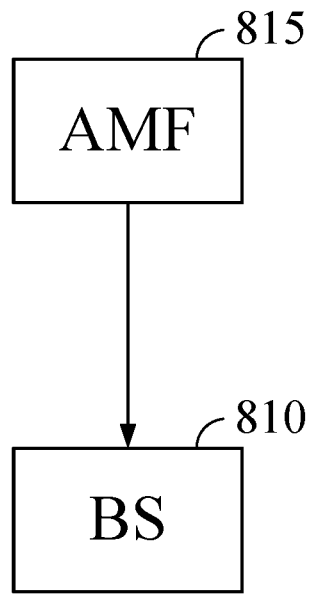
FIG. 8 is a block diagram illustrating a BS receiving paging priority information from an AMF, in accordance with certain aspects of the present disclosure.

FIG. 8 is a block diagram illustrating a BS 810 receiving paging priority information from an AMF 815, in accordance with certain aspects of the present disclosure. As shown in FIG. 8, the BS (e.g., the BS 110a) may receive a paging priority from an AMF. In certain aspects, the reception of the paging priority may be in the context of next generation access protocol (NGAP), such as NGAP paging information 435 described above.

Figure 9:
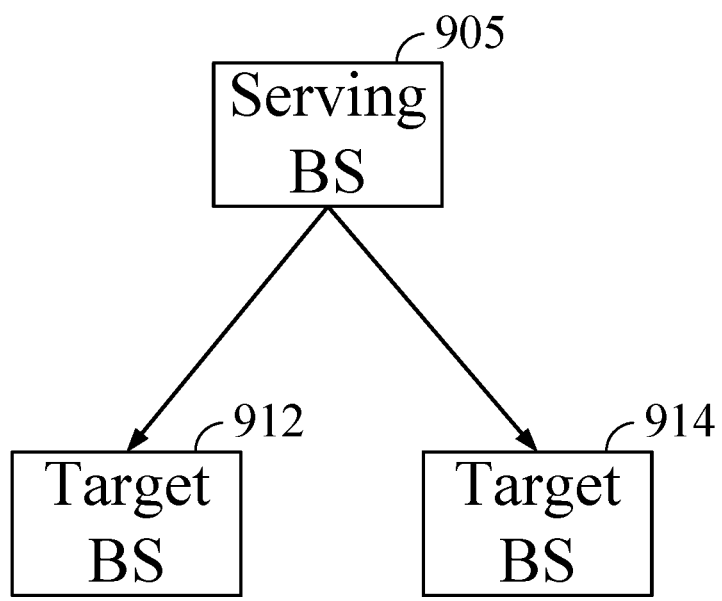
FIG. 9 is a block diagram illustrating two BSs receiving paging priority information during a handover procedure, in accordance with certain aspects of the present disclosure.

FIG. 9 is a block diagram illustrating a target BS 912 and a target BS 914 receiving paging priority information from a serving BS 910 during a handover procedure, in accordance with certain aspects of the present disclosure. As shown in FIG. 9, the serving BS 910 may provide the priority information to each of the target BS 912 and the target BS 914.

In an illustrative example, the paging priority may have a value between 1 and 8, where 1 represents the highest priority. FIG. 10 is a table 1000 showing example priority values used to determine whether to postpone a paging message in POs, in accordance with aspects of the present disclosure.

In certain aspects, when the BS has paging for a UE, the UE may decide whether to send paging (e.g., a paging DCI and a paging message), or to postpone the paging to a later PO, based on a priority of all UEs in the group that monitor within a particular PO. For example, if all the UEs in the group to be paged in the PO have low (e.g. below a threshold) paging priority (e.g., determined based on the paging information, such as Table 1000) and the total number of UEs to be paged in the PO (for which the BS has paging) is relatively small (e.g., below a threshold number of UEs), the BS may decide to postpone the paging to a later PO. Thus, the BS can avoid false paging to the other UEs in the group for which the BS does not have a paging message, and the UEs for which the BS does having paging may be expected to have a higher priority at a later PO and/or in the later PO the BS may have more UEs that are to be paged. On the other hand, if some UEs have high priority (e.g., at or above a paging priority threshold) paging in the PO and/or there are many UEs for which the BS has paging in the PO, then the BS may decide to send paging (e.g., DCI and paging message) to the UEs in the current PO.

Referring back to table 1000, K represents the number of UEs for which the BS has paging in the PO (e.g., PO 0, 1, or 2). Each UE k in the Table 1000 has an associated paging priority $v_k$ ($k \in \{0, 1, \ldots K-1\}$) in the PO. A paging priority V of the UE group may be defined as a function of the paging priorities of the UEs in the group for which the BS has paging:

$$V = f(v_0, v_1, \ldots v_{K-1})$$

The group priority, V, may be a decreasing function of K and an increasing function of $v_k$ as shown below. Furthermore, a lower value of V may correspond to a higher priority. A threshold, $V_{threshold}$, may be defined. If $V < V_{threshold}$, the BS may determine to send the paging for the UEs in the group for which the BS has paging (e.g., paging DCI and paging message) in the PO; otherwise, the BS may postpone paging to a later PO. For example, the BS may determine to postpone paging for the UEs when:

$$V = \frac{\sum_k v_k}{K^2}, V_{threshold} = 1.5,$$

and there are 4 UEs in the same PO, since V is greater than the threshold 1.5. However, in PO 1 and PO2, the BS may determine to not postpone the paging since V is less than the threshold 1.5. Thus, power consumption may be reduced for the UEs.

Figure 11:
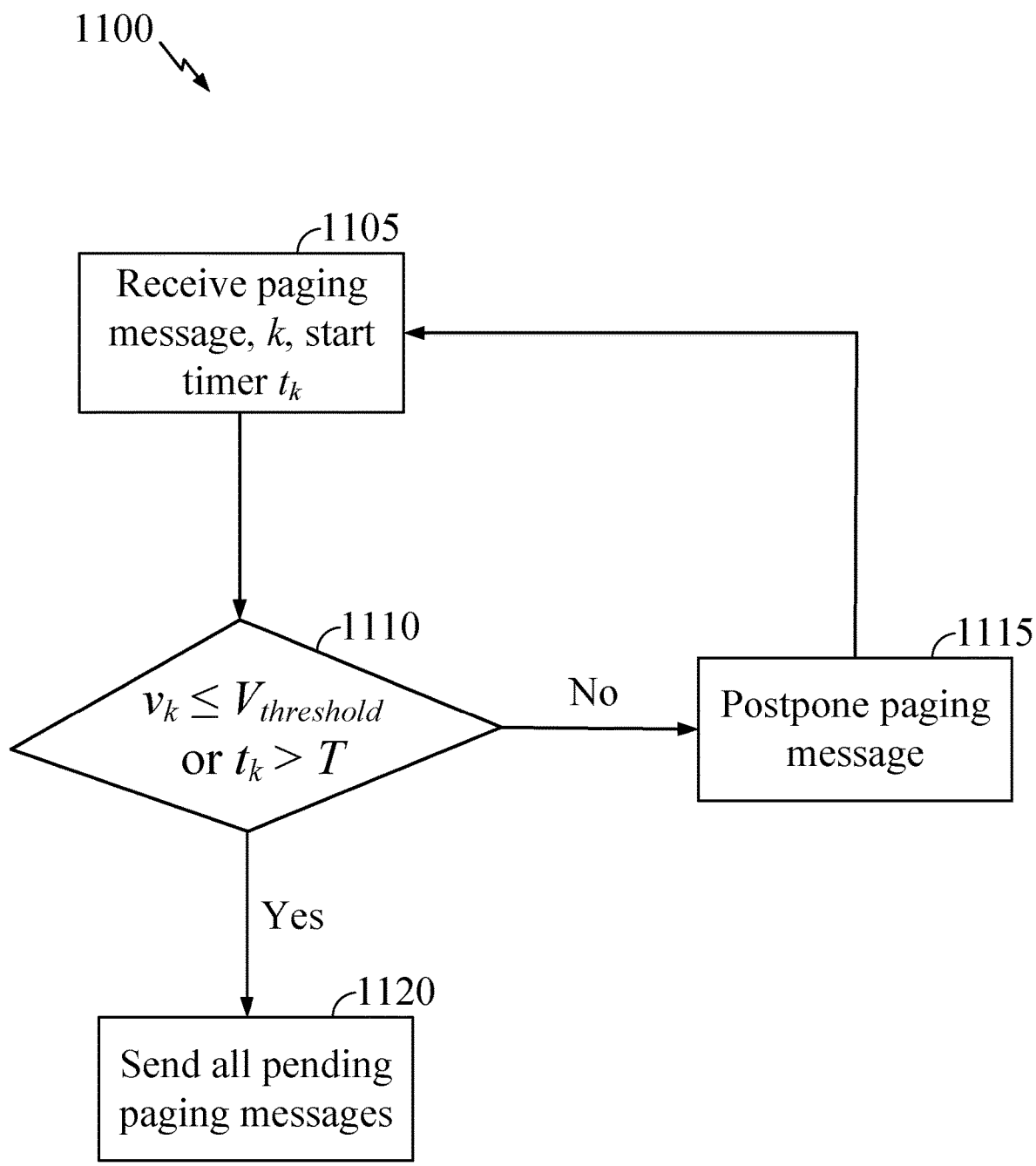
FIG. 11 is an example decision tree for determining whether to postpone paging for a UE, in accordance with aspects of the present disclosure.

FIG. 11 is a flow diagram illustrating an example algorithm 1100 for a BS to determine to send or postpone paging for a group of UEs in the PO, in accordance with aspects of the present disclosure. As shown, at 1105, the BS receives a paging message for a UE k and starts a timer, $t_k$, for the UE k. The BS defines $V_{threshold}$ as the common paging priority threshold, and T as the expiration time. At 1110, the BS determines whether $v_k \leq V_{threshold}$ and/or $t_k > T$. If yes, then, at 1120, the BS sends all pending paging messages it has for UEs, in the group of UEs, in the PO. If neither of the conditions are met, then, at 1115, BS postpones the paging message to the UE k to later PO.

According to certain aspects, UEs may be grouped such that false paging is reduced. For example, UEs may be grouped according to their paging patterns in order to reduce false paging. FIG. 12 is a table 1200 illustrating paging patterns for a UE i and a UE j. UE i and a UE j are UEs in a group that monitor for a paging message in a same PO (e.g., are in a same PO group). As shown, if UE i and UE j are both paged or are both not paged, then there is no false paging reception. Alternatively, if only one of UE i and UE j are paged, then the UE that is not paged may incur a false paging reception.

Accordingly, the network may take into account paging patterns of the UEs in order to form paging groups of UEs with similar traffic patterns. Thus, the group of UEs may be expected to have fewer false paging because the UEs are more likely to have paging in the same POs and to not have paging in the same POs because they have similar traffic patterns. The network may track the history of paging (and/or traffic) for the UEs, such as whether UEs were paged in past POs, in order to determine the paging patterns.

In some examples, the network may define the paging pattern of a UE i as a sequence of binary numbers (e.g., a bitmap), $C_i = \{c_0, c_1, \ldots\}$, where the value of each position in the sequence corresponds to a PO and the value of the binary number indicates whether or not the UE i had paging in the corresponding previous PO.

In some examples, the paging pattern may be determined by UE's traffic. Traffic may be static for a time period. In this case, $c_t$ may indicate whether a UE i was paged in the $t^{th}$ PO.

The network may compare paging patterns of multiple UEs (e.g., UE i and UE j), and, if a correlation between $C_i$ and $C_j$ is high, the network may determine to group UE i and UE j together in a same PO group. If the correlation between $C_i$ and $C_j$ is not high, the network may determine to organize UE i and UE j in different PO groups. In some cases, the AMF may keep track of the paging patterns of each UE in a network, and the AMF may specify a UE's PO by setting its 5G-S-TMSI (temporary mobile subscriber identity).

Figure 13:
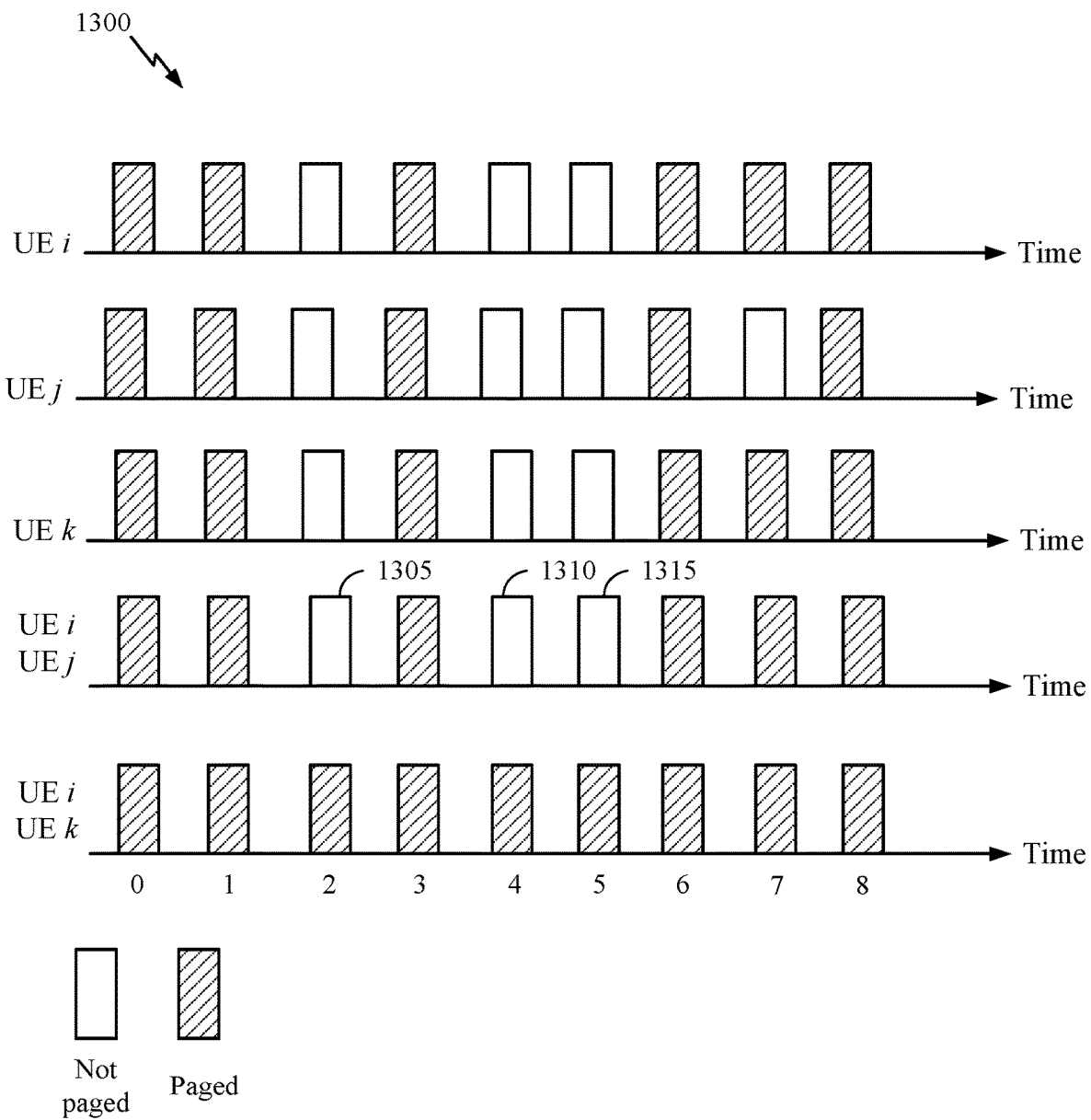
FIG. 13 is a timing diagram illustrating example paging grouping to avoid false paging reception, in accordance with aspects of the present disclosure.

FIG. 13 is a timing diagram 1300 illustrating example grouping of UEs to PO groups to avoid false paging reception, in accordance with aspects of the present disclosure. As shown, for three UEs i, j, k, the BS may determine how to group the UEs. For example, if UE i is grouped with UE k, one of UE i or UE k would be expected to experience a false paging reception since the paging patterns of UE i and UE k are not highly correlated (i.e., not similar). As shown, false paging occurs in the group UE i and UE k in POs 1305, 1310, and 1315. In contrast, it may be advantageous to group UE i with UE j because UE i and UE j have similar paging patters, and thus the number of false paging receptions would be expected to be reduced. As shown, the group UE i and UE j have no false paging in any of the POs.

Figure 14:
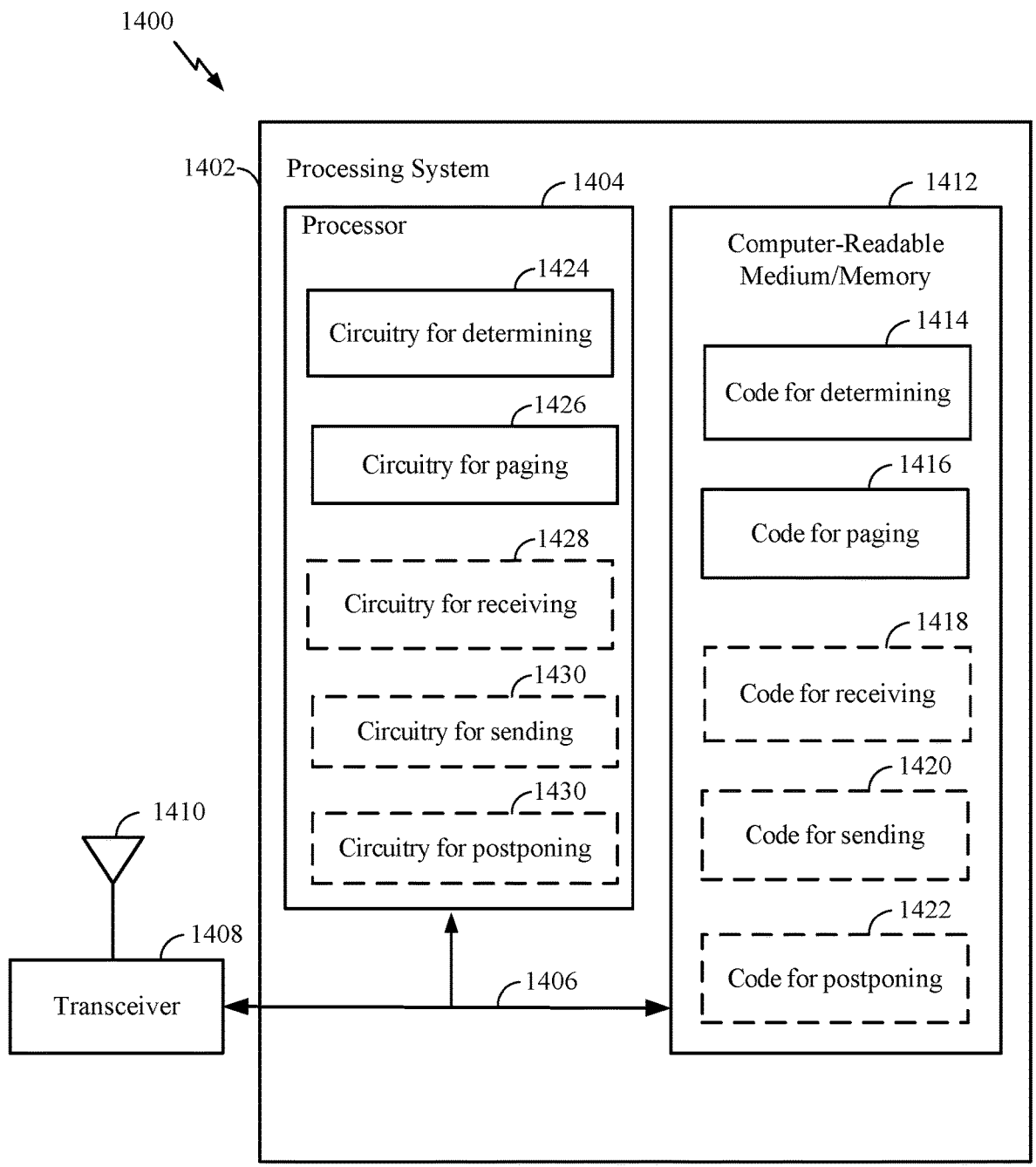
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIGS. 6 and/or 7. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIGS. 6 and/or 7, or other operations for performing the various techniques discussed herein for power saving in paging UEs. In certain aspects, computer-readable medium/memory 1412 stores code 1414 for determining; code 1416 for paging; code 1418 for receiving; code 1420 for sending; and/or code 1422 for postponing. In certain aspects, the processor 1404 has circuitry configured to implement the code stored in the computer-readable medium/memory 1412. The processor 1404 includes circuitry 1424 for determining; circuitry 1426 for paging; circuitry 1428 for receiving; circuitry 1430 for sending; and/or circuitry 1432 for postponing.

Example Aspects

In addition to the various aspects described above, the aspects can be combined. Some specific combinations of aspects are detailed below:

Aspect 1. A method for wireless communication by a base station (BS), comprising: determining a paging behavior for transmitting a paging message to one or more user equipments (UEs) based on an indication from a network entity of one or more priorities associated with the one or more UEs, of one or more paging occasion (PO) groups of the one or more UEs, or both; and paging at least one of the one or more UEs in accordance with the paging behavior.

Aspect 2. The method of aspect 1, wherein transmitting the paging comprises transmitting: a paging downlink control information (DCI); and a paging message.

Aspect 3. The method of any one or more of aspects 1 and 2, wherein the determining the paging behavior comprises: receiving the indication of the one or more priorities associated with the one or more UEs; and determining, based at least in part on the indication of the one or more priorities associated with the one or more UEs, a PO to page the one or more UEs.

Aspect 4. The method of aspect 3, wherein determining, based on the indication of the one or more priorities associated with the one or more UEs, a PO to page the one or more UEs comprises: for a group of UEs configured to monitor paging in a same PO, determining whether to page the group of UEs based on the priorities associated with the group of UEs and the number of UEs of the group of UEs that the BS has paging for.

Aspect 5. The method of aspect 4, wherein determining, based on the indication of the one or more priorities associated with the one or more UEs, a PO to page the one or more UEs comprises: determining to page the group of UEs when at least one of the UEs of the group of UEs has a priority above a first threshold; determining to page the group of UEs when the number of UEs of the group of UEs that the BS has paging for is at or above a second threshold; and determining to postpone the paging to a later PO when none of the UEs of the group of UEs has a priority at or above the first threshold and the number of UEs of the group of UEs that the BS has paging for is below the second threshold.

Aspect 6. The method of any one or more of aspects 3-5, wherein the determining the paging behavior comprises: determining a priority level of a group of UEs configured to monitor paging in a same PO as a quotient of the sum of the priorities associated with each of the UEs of the group of UEs and a square of the number of the UEs of the group of UEs that the BS has paging for; paging the group of UEs in the PO when the priority level of the group of UEs is at or above a priority level threshold; and postponing paging the group of UEs to a later PO when the priority level of the group is below the priority level threshold.

Aspect 7. The method of any one or more of aspects 3-5, wherein determining the paging behavior comprises further determining the paging behavior based on a time duration since a paging message was received at the BS.

Aspect 8. The method of aspect 7, wherein determining the paging behavior comprises further determining the paging behavior based on a time duration since a paging message was received at the BS comprises: receiving one or more paging messages for one or more UEs in a group of UEs; starting a timer when each of the one or more paging messages is received; sending all paging messages for the group of UEs in a PO if a value of the timer of any of the one or more paging messages is at or above a threshold value or a priority level associated with at least one UE in the group of UEs is at or above a priority level threshold; and postponing all paging messages for the groups of UEs in the PO if the value of the none of the timers for the one or more paging messages are below the threshold value and each priority level associated with the UEs in the group of UEs is below the priority level threshold.

Aspect 9. The method of any one or more of aspects 1-8, wherein determining the paging behavior comprises: receiving the indication of one or more PO groups of the one or more UEs; and determining, based at least in part on the indication of the one or more PO groups of the one or more UEs, a PO to page the one or more UEs.

Aspect 10. The method of aspect 9, wherein the one or more PO groups are based on paging patterns of the one or more UEs, and wherein UEs having similar paging patterns are grouped together.

Aspect 11. The method of aspect 10, wherein the paging pattern comprises a history of the paging messages for the one or more UEs.

Aspect 12. The method of any one or more of aspects 10 and 11, wherein the paging pattern is represented by a sequence of bits indicating binary numbers, and wherein each binary number of the sequence indicates whether the UE was paged in a PO associated with a bit location within the sequence.

Aspect 13. The method of any one or more of aspects 9-12, wherein the paging patterns are tracked by an access and mobility management function (AMF).

Aspect 14. A method for wireless communication by a base station (BS), comprising: determining one or more groups of user equipments (UEs), each group of UEs comprising UEs configured to monitor a same paging occasion (PO) for a same paging radio network temporary identifier (PRNTI); determining whether to postpone paging for a group of the one or more groups of UEs based, at least in part, on an indication from a network entity of priorities associated with the UEs in the group; and paging or postponing paging for at least one of the UEs in the group based on the determination.

15. The method of aspect 14, wherein the paging comprises: transmitting a paging downlink control information (DCI) with the PRNTI; and transmitting a paging message.

Aspect 16. The method of any one or more of aspects 14-15, wherein determining whether to postpone paging for the group is further based on a number of UEs of the group that the BS has paging for.

Aspect 17. The method of aspect 16, wherein determining whether to postpone paging for the group comprises: determining to page the group of UEs in a first available PO when at least one of the UEs of the group of UEs has a priority above a first threshold; determining to page the group of UEs in the first available PO when the number of UEs of the group of UEs that the BS has paging for is at or above a second threshold; and determining to postpone the paging to a later PO when none of the UEs of the group of UEs has a priority at or above the first threshold and the number of UEs of the group of UEs that the BS has paging for is below the second threshold.

Aspect 18. The method of aspect 16, wherein determining whether to postpone paging for the group comprises: determining a priority level of the group as a quotient of a sum of the priorities of the UEs of the group of UEs and a square of the number of the UEs of the group of UEs that the BS has paging for; determining to page the group of UEs in a first available PO when the determined priority level of the group of UEs is at or above a priority level threshold; and determining to postpone paging the group of UEs to a later PO when the determined priority level of the group of UEs is below the priority level threshold.

Aspect 19. The method of any one or more aspects 14-18, wherein determining whether to postpone paging for the group is further based on a time duration since a paging message for the group was received at the BS.

Aspect 20. The method of aspect 19, wherein determining whether to postpone paging for the group comprises: receiving one or more paging messages for one or more UEs in the group of UEs; starting a timer when each of the one or more paging messages is received; sending the one or more received paging messages for the group of UEs in an available PO if a value of any of the timers for any of the one or more paging messages is at or above a threshold value or a priority level associated with at least one UE in the group of UEs is at or above a priority level threshold; and postponing the one or more paging messages for the one or more UEs in the group of UEs to a later PO if none of the values of the timers for the one or more paging messages is below the threshold value and each priority level associated with the UEs in the group of UEs is below the priority level threshold.

Aspect 21. The method of any one or more aspects 14-20, wherein determining the one or more groups of UEs comprises receiving an indication of the one or more groups of UEs.

Aspect 22. The method of any one or more of aspects 14-21, wherein the one or more groups of UEs are grouped based on paging patterns of the one or more UEs, where UEs having similar paging patterns are grouped together.

Aspect 23. The method of aspect 22, wherein the paging patterns of the one or more UEs comprise histories of paging messages for the one or more UEs.

Aspect 24. The method of any one or more of aspects 22-23, wherein each paging pattern is represented by a sequence of bits, and wherein each bit indicates whether the UE was paged in a PO associated with a location of the bit within the sequence.

Aspect 25. The method of any one or more of aspects 22-24, wherein the paging patterns are tracked by an access and mobility management function (AMF).

Aspect 26. An apparatus comprising means for performing the method of any one or more of aspects 1 through 25.

Aspect 27. An apparatus comprising at least one processor and a memory coupled to the at least one processor, the memory comprising code executable by the at least one processor to cause the apparatus to perform the method of any of aspects 1 through 25.

Aspect 28. A computer readable medium storing computer executable code thereon for wireless communications that, when executed by at least one processor, cause an apparatus to perform the method of any one or more of aspects 1 through 25.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

The invention claimed is:

1. A method for wireless communication by a base station (BS), comprising:
  determining one or more groups of user equipments (UEs), each group of UEs comprising UEs configured to monitor a same paging occasion (PO) for a same paging radio network temporary identifier (PRNTI);
  determining whether to postpone paging for a group of the one or more groups of UEs based, at least in part, on an indication from a network entity of priorities associated with the UEs in the group, wherein determining whether to postpone paging for the group includes:
    determining a priority level of the group based on:
      the priorities associated with the UEs in the group; and
      a number of the UEs in the group that the BS has paging for; and
  paging or postponing paging for at least one of the UEs in the group based on the determination whether to postpone paging for the group.

2. The method of claim 1, wherein the paging comprises:
  transmitting a paging downlink control information (DCI) with the PRNTI; and
  transmitting a paging message.

3. The method of claim 1, wherein determining whether to postpone paging for the group further comprises:
  determining to page the group of UEs in a first available PO when at least one of the UEs of the group of UEs has a priority above a first threshold;
  determining to page the group of UEs in the first available PO when the number of UEs of the group of UEs that the BS has paging for is at or above a second threshold; and
  determining to postpone the paging to a later PO when none of the UEs of the group of UEs has a priority at or above the first threshold and the number of UEs of the group of UEs that the BS has paging for is below the second threshold.

4. The method of claim 1, wherein:
  determining the priority level of the group based on the priorities associated with the UEs in the group and the number of the UEs in the group that the BS has paging for comprises determining the priority level of the group as a quotient of a sum of the priorities of the UEs of the group of UEs and a square of the number of the UEs of the group of UEs that the BS has paging for; and
  determining whether to postpone paging for the group comprises:
    determining to page the group of UEs in a first available PO when the determined priority level of the group of UEs is at or above a priority level threshold; and
    determining to postpone paging the group of UEs to a later PO when the determined priority level of the group of UEs is below the priority level threshold.

5. The method of claim 1, wherein determining whether to postpone paging for the group is further based on a time duration since a paging message for the group was received at the BSa.

6. The method of claim 5, wherein determining whether to postpone paging for the group based on a time duration since a paging message for the group was received at the BS comprises:
  receiving one or more paging messages for one or more UEs in the group of UEs;
  starting a timer when each of the one or more paging messages is received;
  sending the one or more received paging messages for the group of UEs in an available PO if a value of any of the timers for any of the one or more paging messages is at or above a threshold value or a priority level associated with at least one UE in the group of UEs is at or above a priority level threshold; and
  postponing the one or more paging messages for the one or more UEs in the group of UEs to a later PO if none of the values of the timers for the one or more paging messages is below the threshold value and each priority level associated with the UEs in the group of UEs is below the priority level threshold.

7. The method of claim 1, wherein determining the one or more groups of UEs comprises receiving an indication of the one or more groups of UEs.

8. An apparatus for wireless communication by a base station (BS), comprising:
  at least one processor; and
  a memory coupled to the at least one processor, the memory comprising code executable by the at least one processor to cause the apparatus to:
    determine one or more groups of user equipments (UEs), each group of UEs comprising UEs configured to monitor a same paging occasion (PO) for a same paging radio network temporary identifier (PRNTI);
    determine whether to postpone paging for a group of the one or more groups of UEs based, at least in part, on an indication from a network entity of priorities associated with the UEs in the group, wherein the code executable by the at least one processor to cause the apparatus to determine whether to postpone paging for the group includes:
      code executable by the at least one processor to cause the apparatus to determine a priority level of the group based on:
        the priorities associated with the UEs in the group; and
        a number of the UEs in the group that the BS has paging for; and
    page or postpone paging for at least one of the UEs in the group based on the determination whether to postpone paging for the group.

9. The apparatus of claim 8, wherein the paging comprises:
  transmitting a paging downlink control information (DCI) with the PRNTI; and
  transmitting a paging message.

10. The apparatus of claim 8, wherein the code executable by the at least one processor to cause the apparatus to determine whether to postpone paging for the group comprises code executable by the at least one processor to further cause the apparatus to:
  determine to page the group of UEs in a first available PO when at least one of the UEs of the group of UEs has a priority above a first threshold;
  determine to page the group of UEs in the first available PO when the number of UEs of the group of UEs that the BS has paging for is at or above a second threshold; and
  determine to postpone the paging to a later PO when none of the UEs of the group of UEs has a priority at or above the first threshold and the number of UEs of the group of UEs that the BS has paging for is below the second threshold.

11. The apparatus of claim 8, wherein the code executable by the at least one processor to cause the apparatus to determine the priority level of the group based on the priorities associated with the UEs in the group and the number of the UEs in the group that the BS has paging for comprises code executable by the at least one processor to cause the apparatus to determine the priority level of the group as a quotient of a sum of the priorities of the UEs of the group of UEs and a square of the number of the UEs of the group of UEs that the BS has paging for; and the code executable by the at least one processor to cause the apparatus to determine whether to postpone paging for the group comprises code executable by the at least one processor to cause the apparatus to:
  determine to page the group of UEs in a first available PO when the determined priority level of the group of UEs is at or above a priority level threshold; and
  determine to postpone paging the group of UEs to a later PO when the determined priority level of the group of UEs is below the priority level threshold.

12. The apparatus of claim 8, wherein the code executable by the at least one processor to cause the apparatus to determine whether to postpone paging for the group comprises code executable by the at least one processor to cause the apparatus to determine whether to postpone paging for the group further based on a time duration since a paging message for the group was received at the BSa.

13. The apparatus of claim 12, wherein the code executable by the at least one processor to cause the apparatus to determine whether to postpone paging for the group based on a time duration since a paging message for the group was received at the BS comprises code executable by the at least one processor to cause the apparatus to:
  receive one or more paging messages for one or more UEs in the group of UEs;
  start a timer when each of the one or more paging messages is received;
  send the one or more received paging messages for the group of UEs in an available PO if a value of any of the timers for any of the one or more paging messages is at or above a threshold value or a priority level associated with at least one UE in the group of UEs is at or above a priority level threshold; and
  postpone the one or more paging messages for the one or more UEs in the group of UEs to a later PO if none of the values of the timers for the one or more paging messages is below the threshold value and each priority level associated with the UEs in the group of UEs is below the priority level threshold.

14. The apparatus of claim 8, wherein the code executable by the at least one processor to cause the apparatus to determine the one or more groups of UEs comprises code executable by the at least one processor to cause the apparatus to receive an indication of the one or more groups of UEs.

15. An apparatus for wireless communication by a base station (BS), comprising:
  means for determining one or more groups of user equipments (UEs), each group of UEs comprising UEs configured to monitor a same paging occasion (PO) for a same paging radio network temporary identifier (PRNTI);
  means for determining whether to postpone paging for a group of the one or more groups of UEs based, at least in part, on an indication from a network entity of priorities associated with the UEs in the group, wherein the means for determining whether to postpone paging for the group includes:
    means for determining a priority level of the group based on:
      the priorities associated with the UEs in the group; and
      a number of the UEs in the group that the BS has paging for; and
    means for paging or postponing paging for at least one of the UEs in the group based on the determination whether to postpone paging for the group.

16. The apparatus of claim 15, wherein the means for paging comprises:
  means for transmitting a paging downlink control information (DCI) with the PRNTI; and
  means for transmitting a paging message.

17. The apparatus of claim 15, wherein means for determining whether to postpone paging for the group further comprises:
  means for determining to page the group of UEs in a first available PO when at least one of the UEs of the group of UEs has a priority above a first threshold;
  means for determining to page the group of UEs in the first available PO when the number of UEs of the group of UEs that the BS has paging for is at or above a second threshold; and
  means for determining to postpone the paging to a later PO when none of the UEs of the group of UEs has a priority at or above the first threshold and the number of UEs of the group of UEs that the BS has paging for is below the second threshold.

18. The apparatus of claim 15, wherein means for determining the priority level of the group based on the priorities associated with the UEs in the group and the number of the UEs in the group that the BS has paging for comprises means for determining the priority level of the group as a quotient of a sum of the priorities of the UEs of the group of UEs and a square of the number of the UEs of the group of UEs that the BS has paging for; and
  means for determining whether to postpone paging for the group comprises:
    means for determining to page the group of UEs in a first available PO when the determined priority level of the group of UEs is at or above a priority level threshold; and
    means for determining to postpone paging the group of UEs to a later PO when the determined priority level of the group of UEs is below the priority level threshold.

19. A non-transitory computer readable medium storing computer executable code thereon for wireless communications by a base station (BS), comprising:
  code for determining one or more groups of user equipments (UEs), each group of UEs comprising UEs configured to monitor a same paging occasion (PO) for a same paging radio network temporary identifier (PRNTI);
  code for determining whether to postpone paging for a group of the one or more groups of UEs based, at least in part, on an indication from a network entity of priorities associated with the UEs in the group, wherein the code for determining whether to postpone paging for the group includes:

code for determining a priority level of the group based on:
- the priorities associated with the UEs in the group; and
- a number of the UEs in the group that the BS has paging for; and code for paging or postponing paging for at least one of the UEs in the group based on the determination whether to postpone paging for the group.

* * * * *